US012564282B2

(12) United States Patent
Kim

(10) Patent No.: US 12,564,282 B2
(45) Date of Patent: Mar. 3, 2026

(54) JUICE MODULE FOR JUICER

(71) Applicant: NUC Electronics Co., Ltd., Daegu (KR)

(72) Inventor: Jong Boo Kim, Daegu (KR)

(73) Assignee: NUC Electronics Co., Ltd., Daegu (KR)

( * ) Notice: Subject to any disclaimer, the term of this patent is extended or adjusted under 35 U.S.C. 154(b) by 51 days.

(21) Appl. No.: 17/919,516

(22) PCT Filed: Feb. 11, 2022

(86) PCT No.: PCT/KR2022/002109
§ 371 (c)(1),
(2) Date: Oct. 17, 2022

(87) PCT Pub. No.: WO2023/075037
PCT Pub. Date: May 4, 2023

(65) Prior Publication Data
US 2024/0292972 A1 Sep. 5, 2024

(30) Foreign Application Priority Data

Oct. 27, 2021 (KR) ........................ 10-2021-0144416
Dec. 8, 2021 (KR) ........................ 10-2021-0174325

(51) Int. Cl.
*A47J 19/02* (2006.01)
*A23N 1/02* (2006.01)

(52) U.S. Cl.
CPC .............. *A47J 19/025* (2013.01); *A23N 1/02* (2013.01); *A47J 19/02* (2013.01)

(58) Field of Classification Search
CPC ........ A47J 19/025; A47J 19/023; A47J 19/02; A23N 1/02
See application file for complete search history.

(56) References Cited

U.S. PATENT DOCUMENTS

2014/0196614 A1 7/2014 Kim
2015/0164129 A1 6/2015 Kim

FOREIGN PATENT DOCUMENTS

CN 202874935 U 4/2013
CN 104207620 A * 12/2014 ............ A47J 19/025
(Continued)

OTHER PUBLICATIONS

Amendment (with English Translation), published Oct. 20, 2016, for Japanese Patent Publication No. JP 2015128619. (8 pages).

*Primary Examiner* — Reginald Alexander
(74) *Attorney, Agent, or Firm* — Seed Intellectual Property Group LLP

(57) ABSTRACT

A juice module includes a juice drum accommodating a mesh body therein and coupled to an upper end of a main body, wherein a lid into which a juice object is input is coupled to an upper portion of the juice drum; and a screw mounted inside the mesh body to rotate with respect to a screw rotation shaft, having a spiral rib formed on an outer circumferential surface, and receiving and crushing the juice object from the lid, wherein the screw includes a support surface formed in a direction intersecting the screw rotation shaft to support the juice object input into the lid and a crushing portion formed on an upper end to intersect the support surface and cutting the juice object, and wherein the lid includes an inlet into which the juice object is input, the inlet guiding the juice object to reach the spiral rib or the support surface.

13 Claims, 15 Drawing Sheets

(56)     References Cited

FOREIGN PATENT DOCUMENTS

| CN | 104271009 A | | 1/2015 | |
| CN | 107432654 A | * | 12/2017 | ............. A47J 19/02 |
| CN | 107912956 A | * | 4/2018 | ............. A47J 19/06 |
| CN | 108013725 A | | 5/2018 | |
| CN | 208769435 U | * | 4/2019 | ........... A47J 19/025 |
| CN | 112220327 A | | 1/2021 | |
| EP | 2875758 B1 | | 6/2017 | |
| EP | 3636122 A1 | * | 4/2020 | ......... A47J 43/0788 |
| JP | 2015128619 A | | 7/2015 | |
| KR | 10-0793852 B1 | | 1/2008 | |
| KR | 10-0966607 B1 | | 6/2010 | |
| KR | 10-1300464 B1 | | 8/2013 | |
| KR | 10-2015-0094102 A | | 8/2015 | |
| KR | 10-2015-0102414 A | | 9/2015 | |
| KR | 10-2015-0115259 A | | 10/2015 | |
| KR | 10-2016-0066864 A | | 6/2016 | |
| KR | 20180057480 A | | 5/2018 | |
| KR | 20-2020-0001620 U | | 7/2020 | |
| KR | 102239344 B1 | | 4/2021 | |
| RU | 2626713 C2 | | 7/2017 | |
| WO | 2016139081 A1 | | 9/2016 | |
| WO | WO 2020186309 A1 | | 9/2020 | |
| WO | WO 2021080234 A1 | | 4/2021 | |
| WO | WO 2023075037 A1 | | 5/2023 | |

* cited by examiner

【FIG. 1】
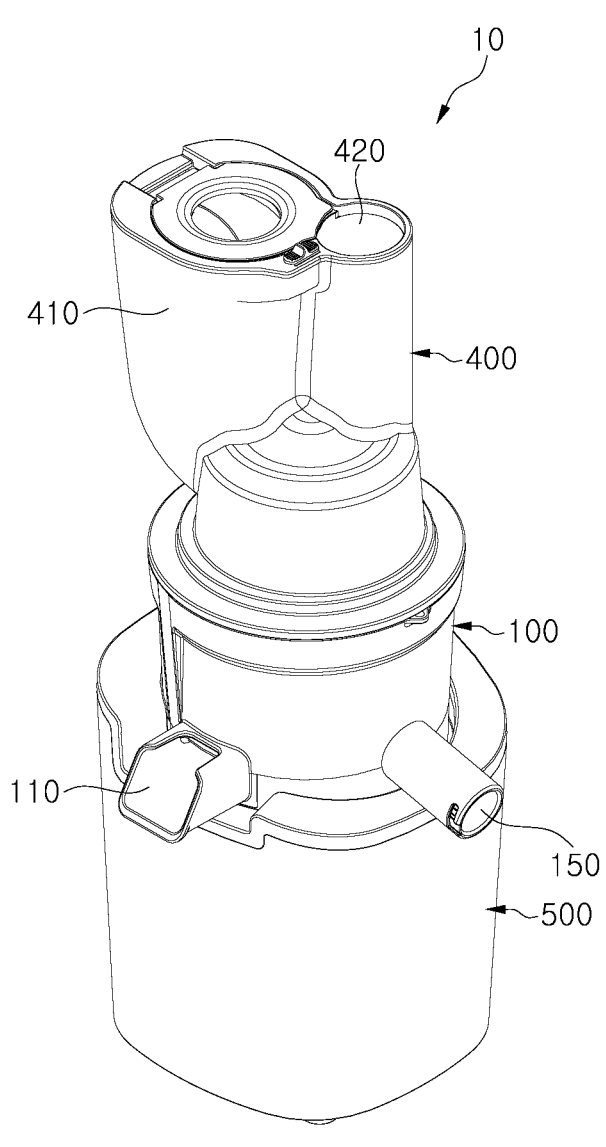

【FIG. 2】
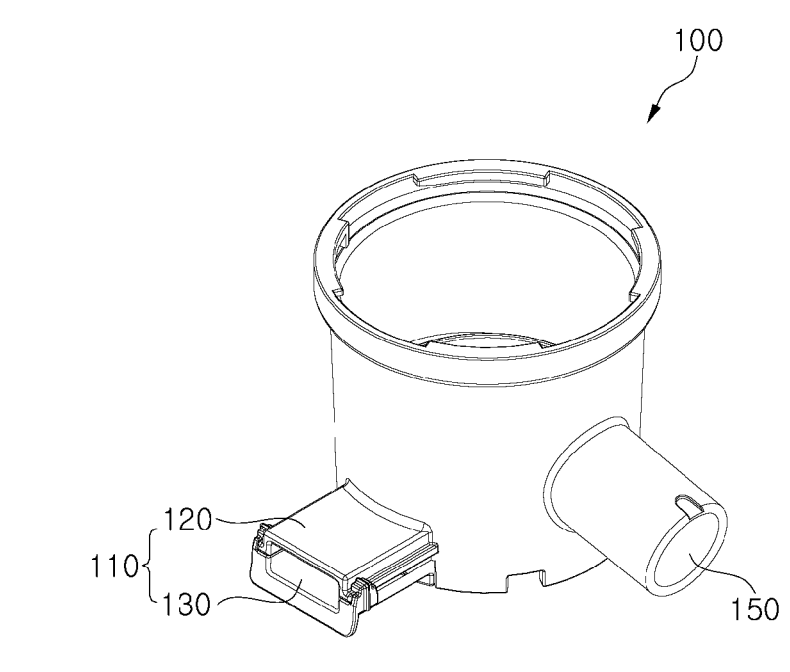
(a)
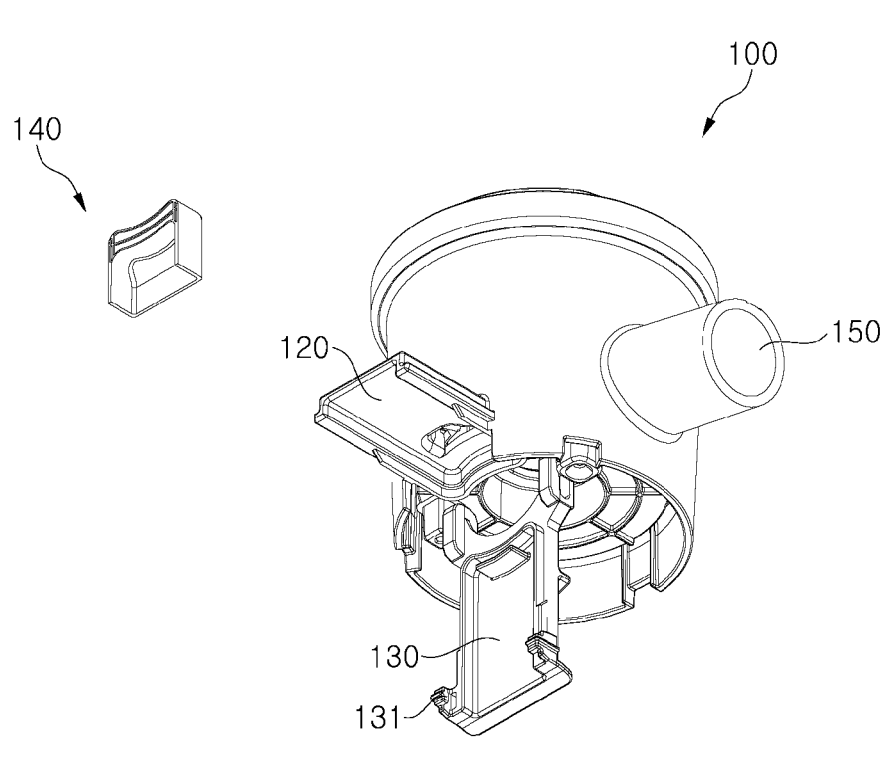
(b)

【FIG. 3】
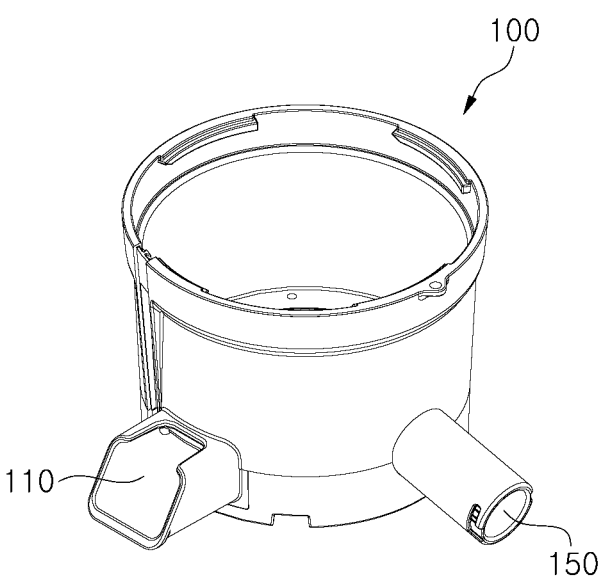
【FIG. 4】
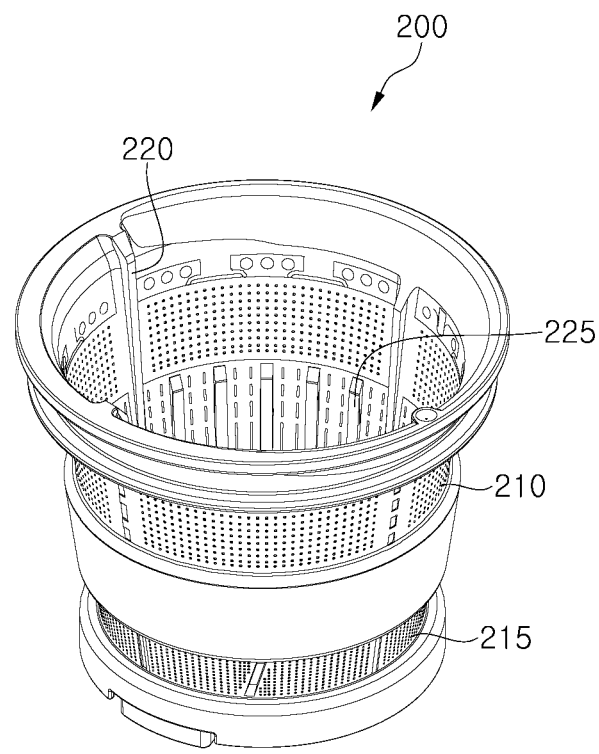

【FIG. 5】
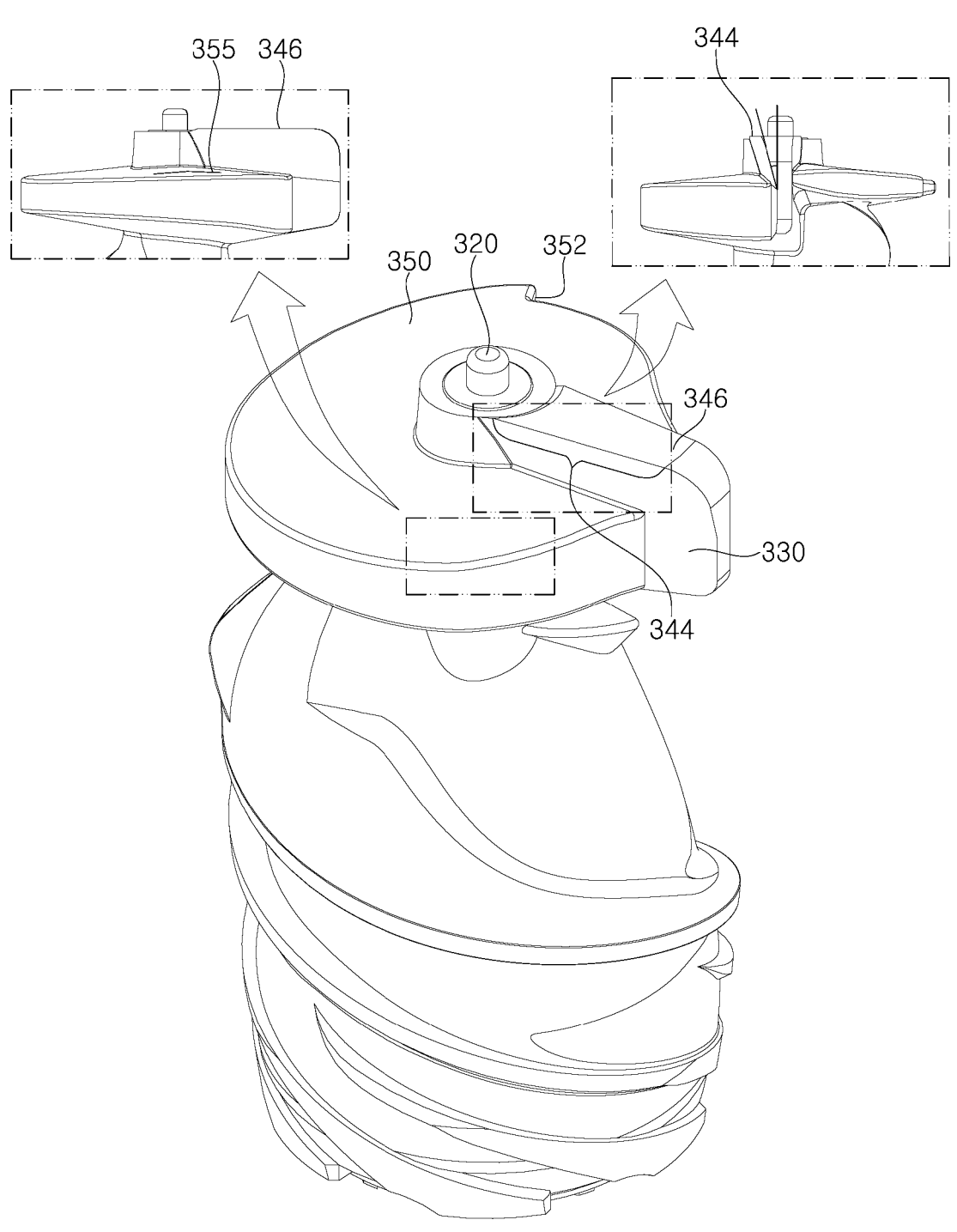

【FIG. 6】
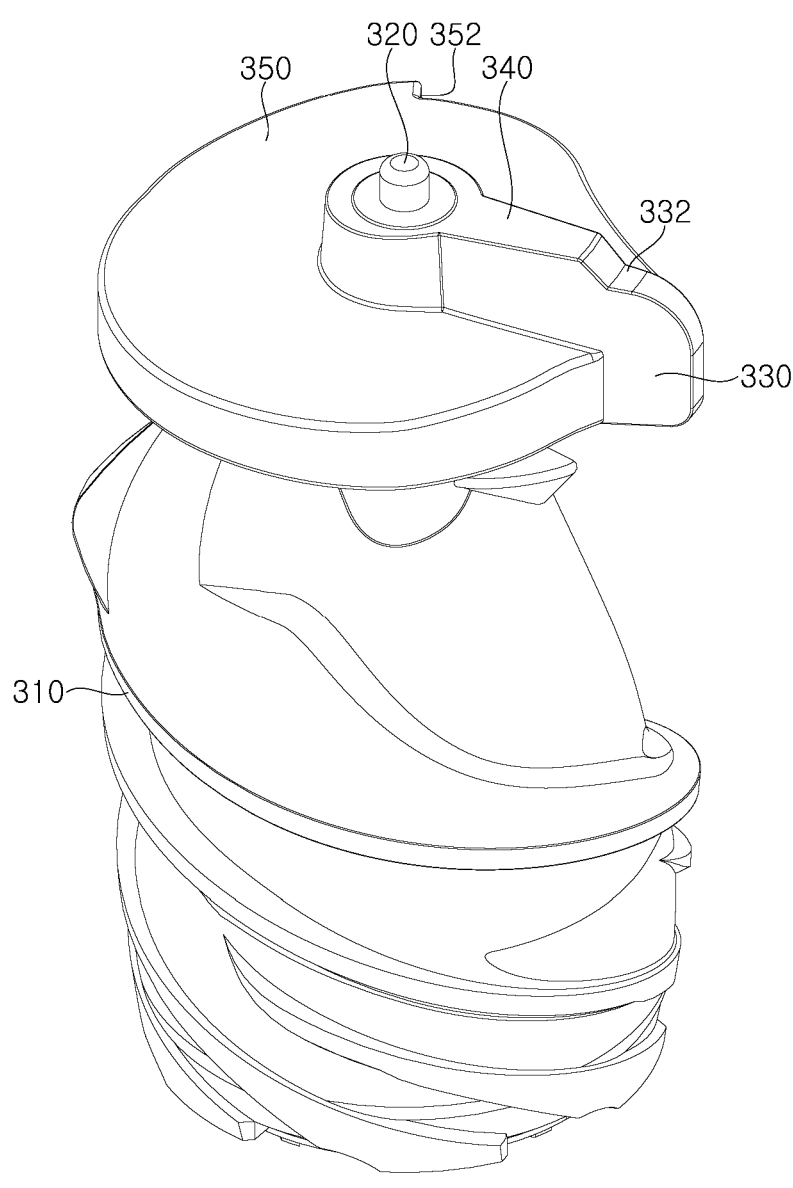

【FIG. 7】
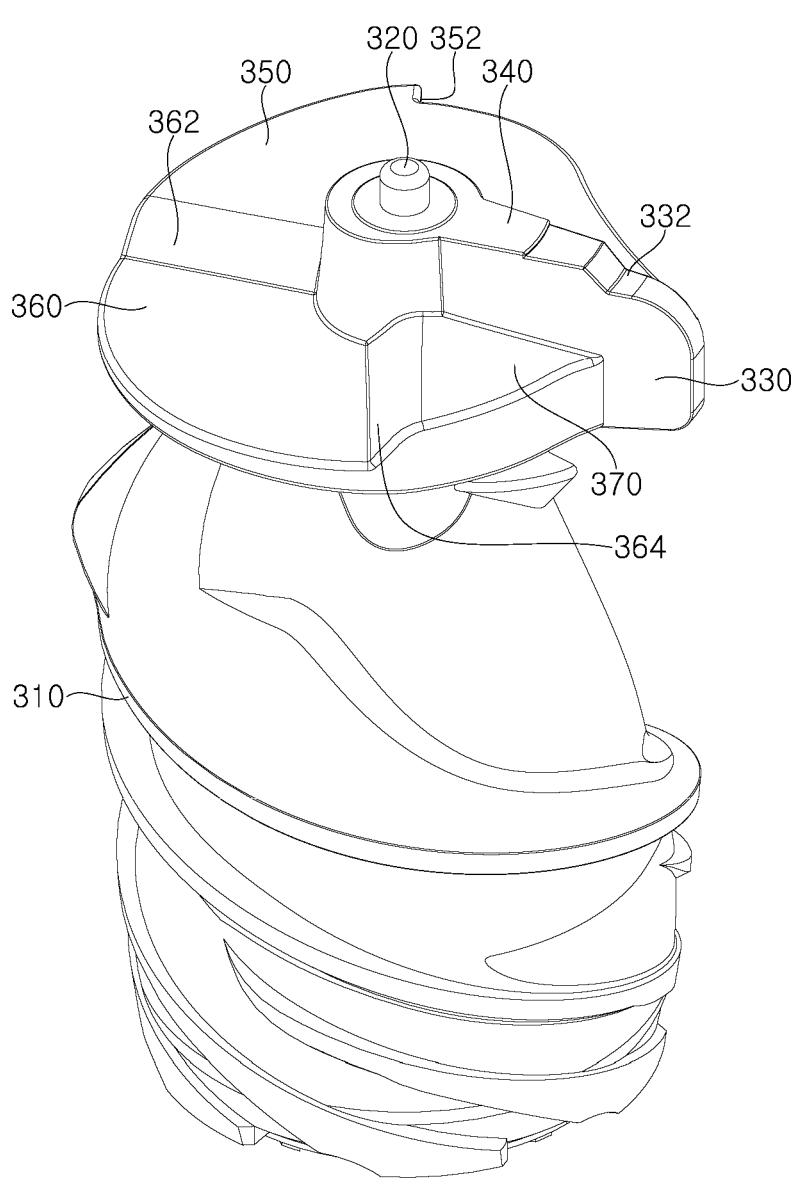

【FIG. 8】
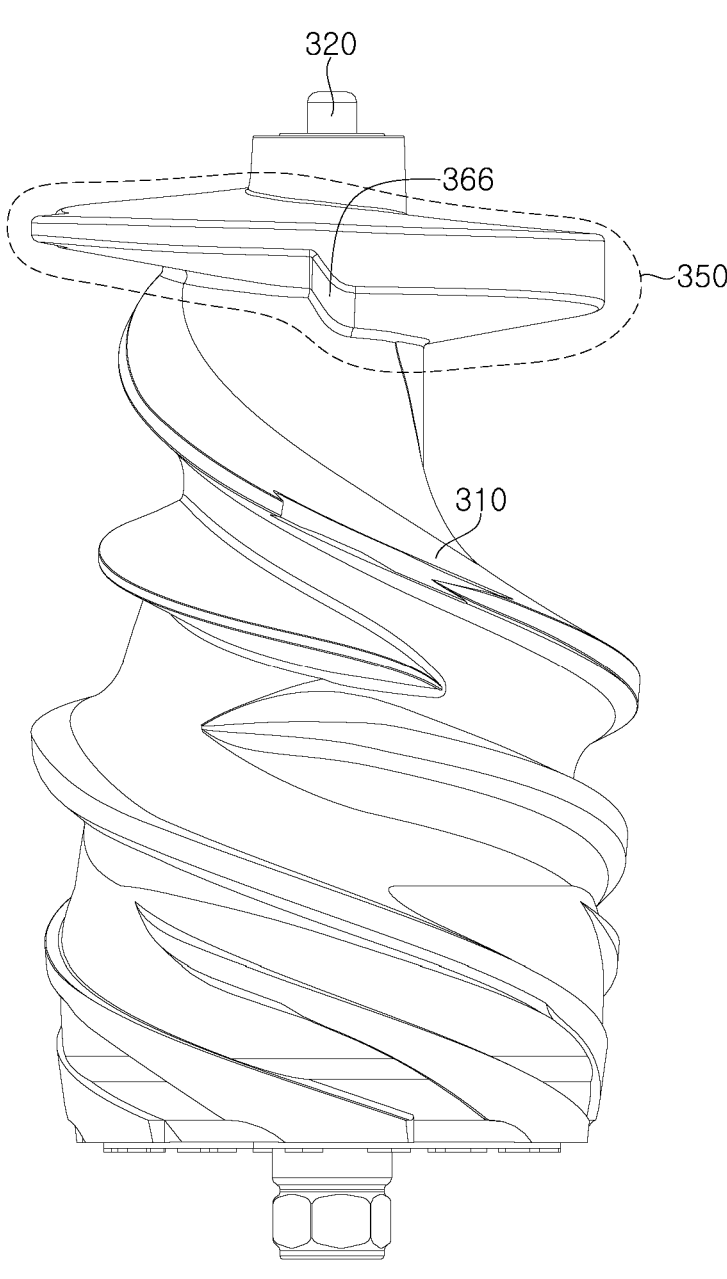

【FIG. 9】
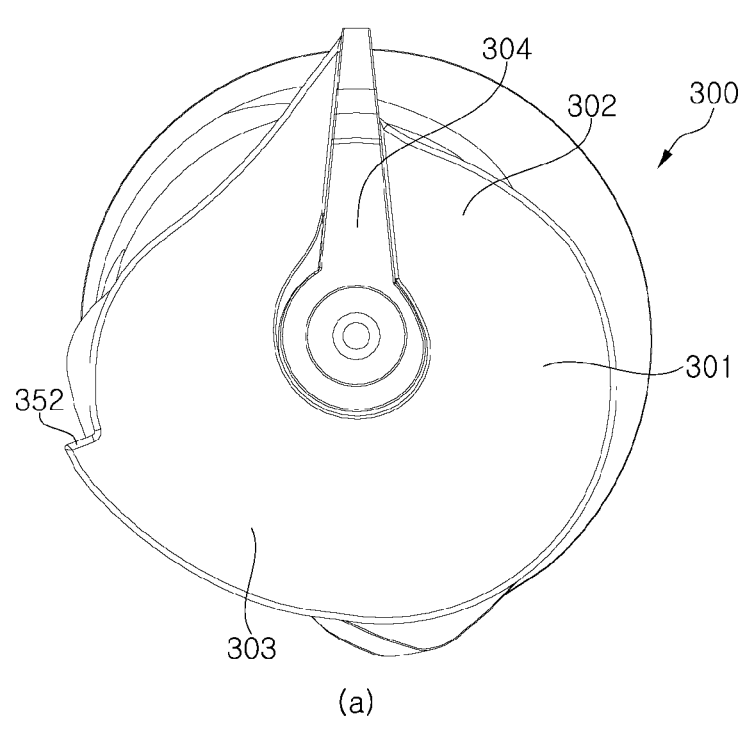
(a)
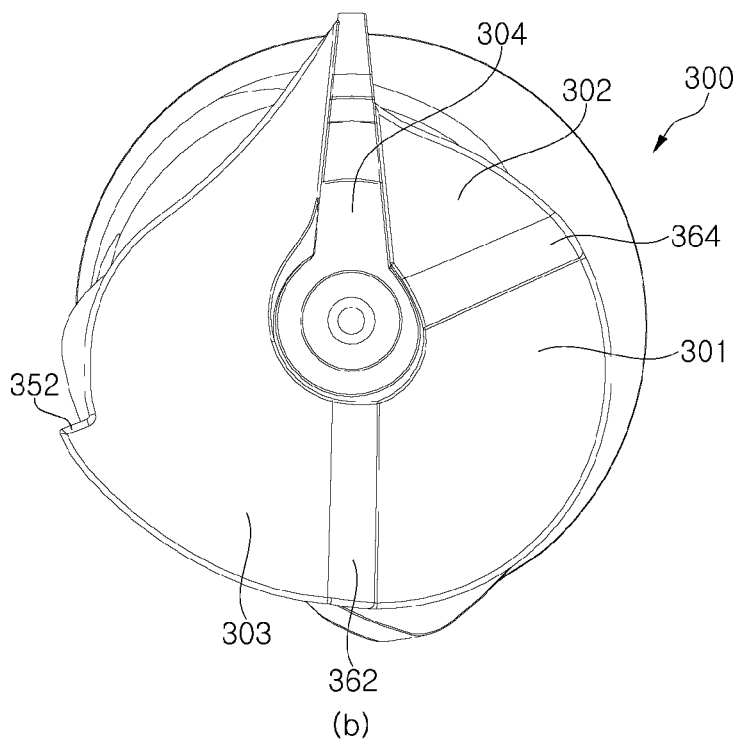
(b)

【FIG. 10】
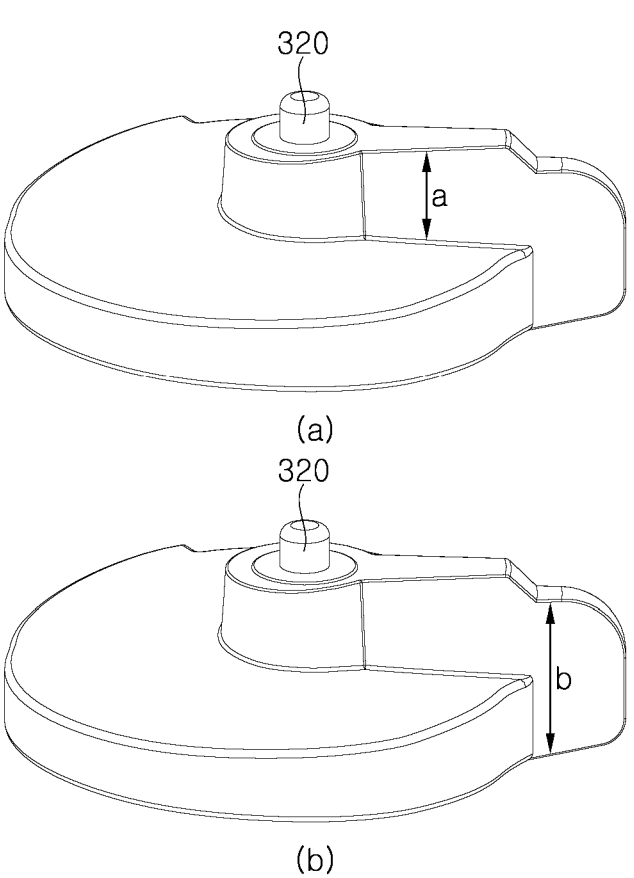
(a)
(b)

【FIG. 11】
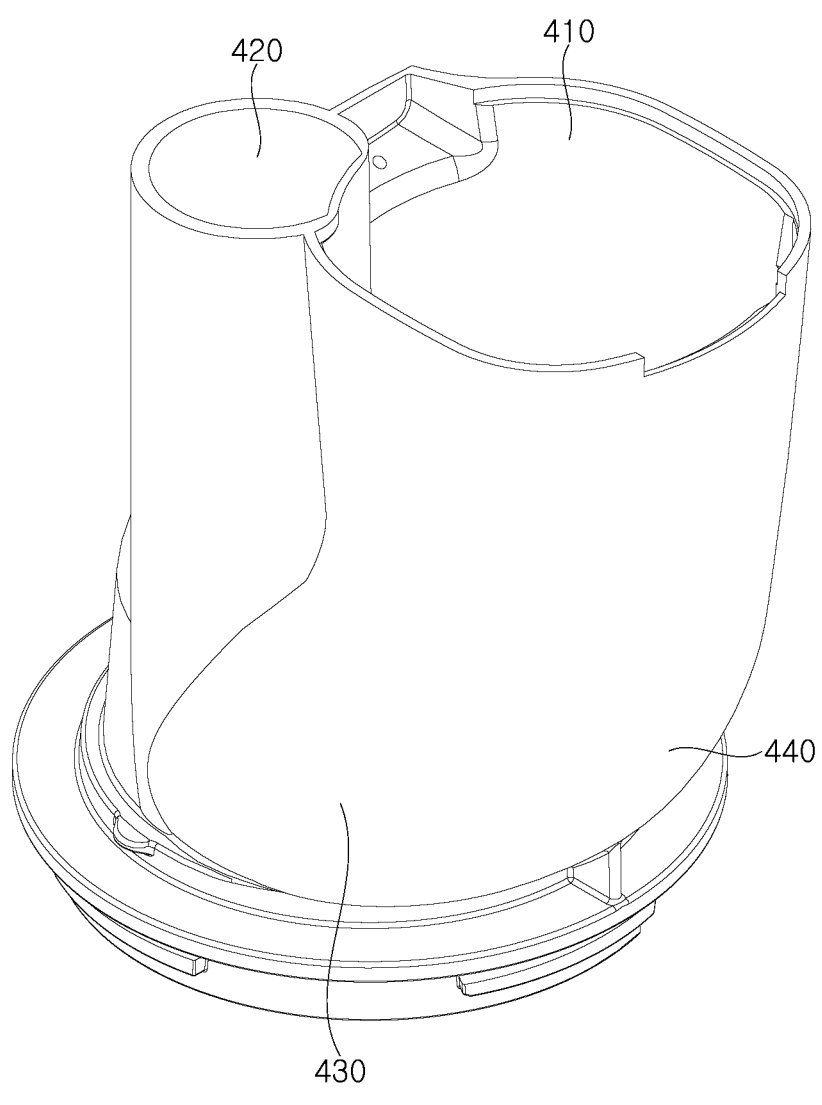

【FIG. 12】
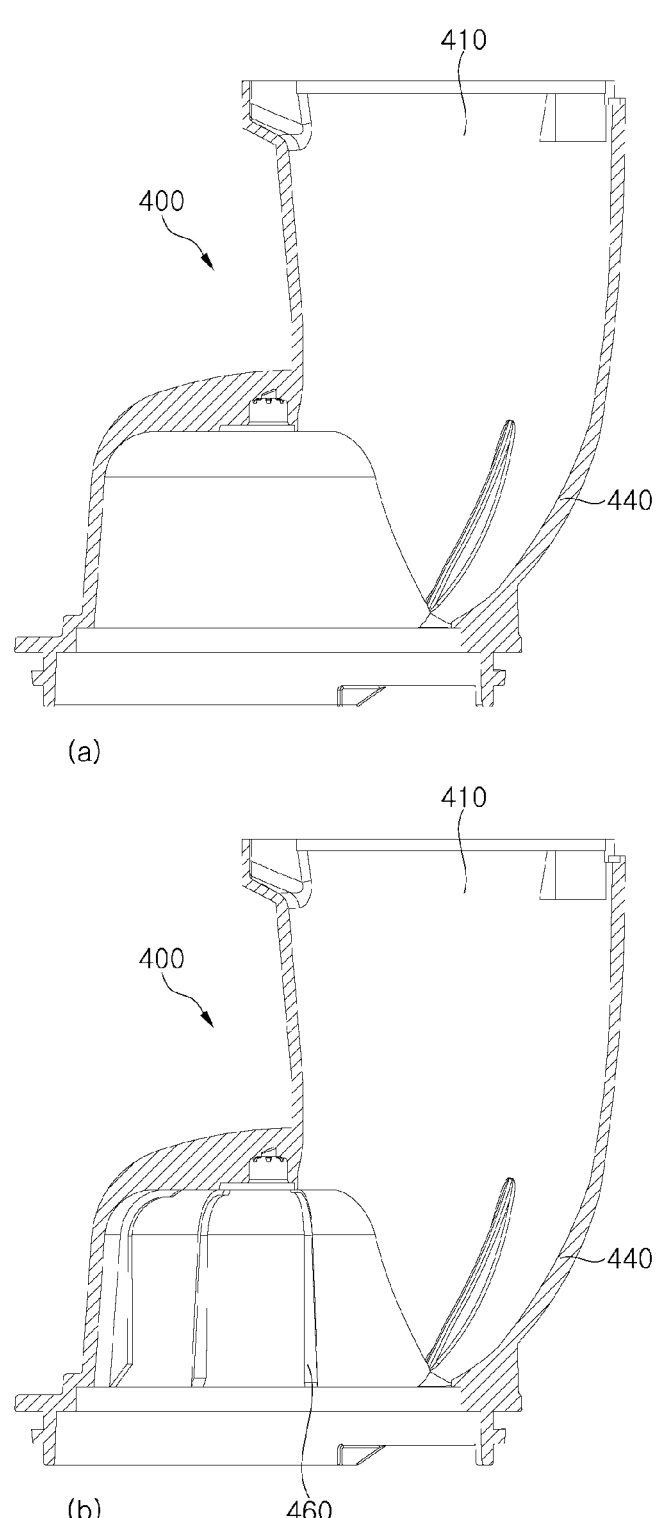
(a)
(b)

【FIG. 13】
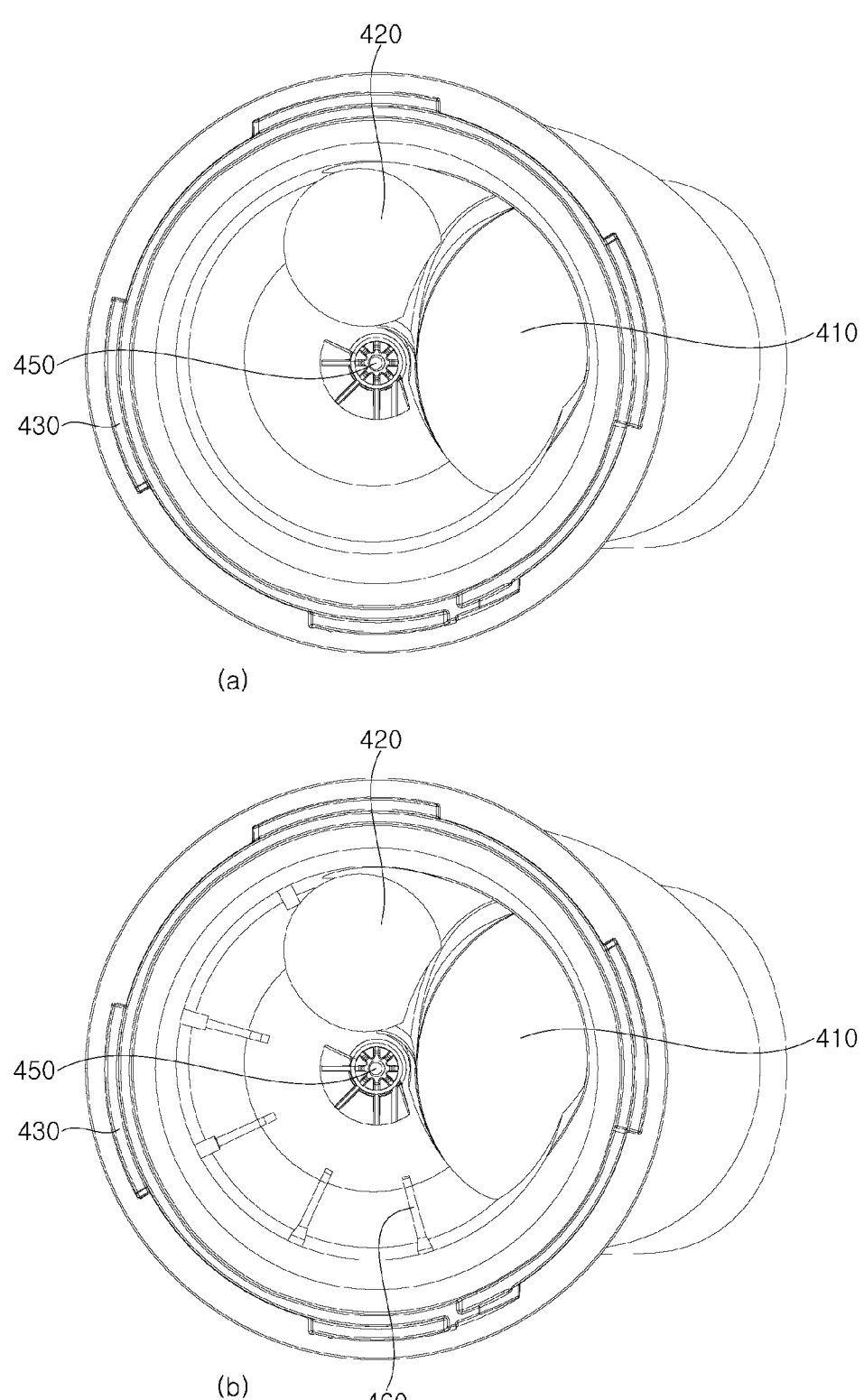
(a)
(b)

【FIG. 14】
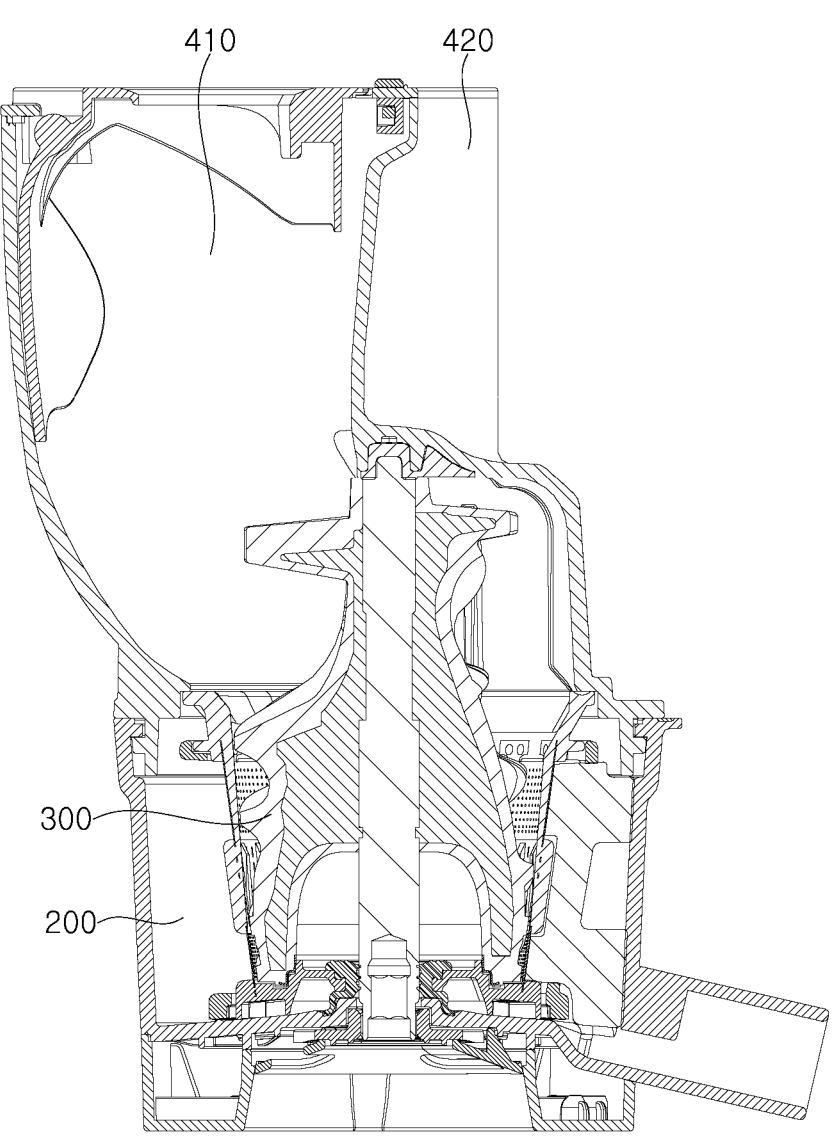

【FIG. 15】
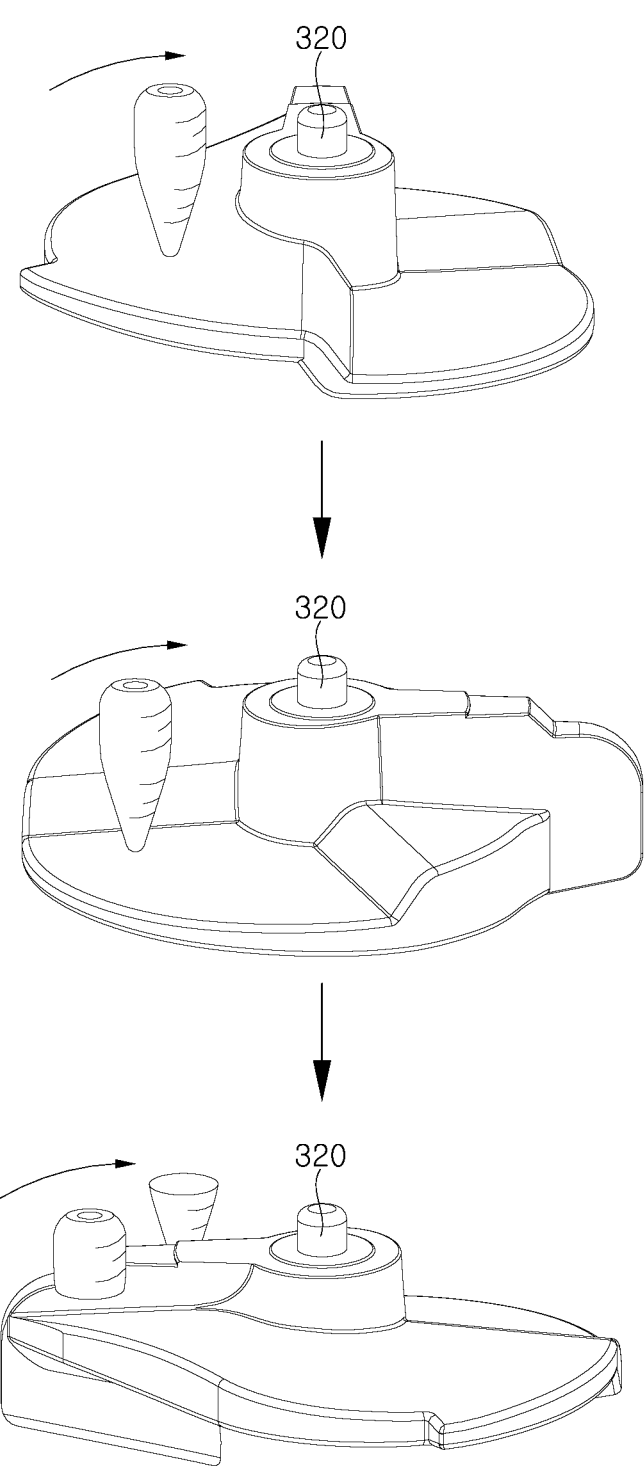

【FIG. 16】
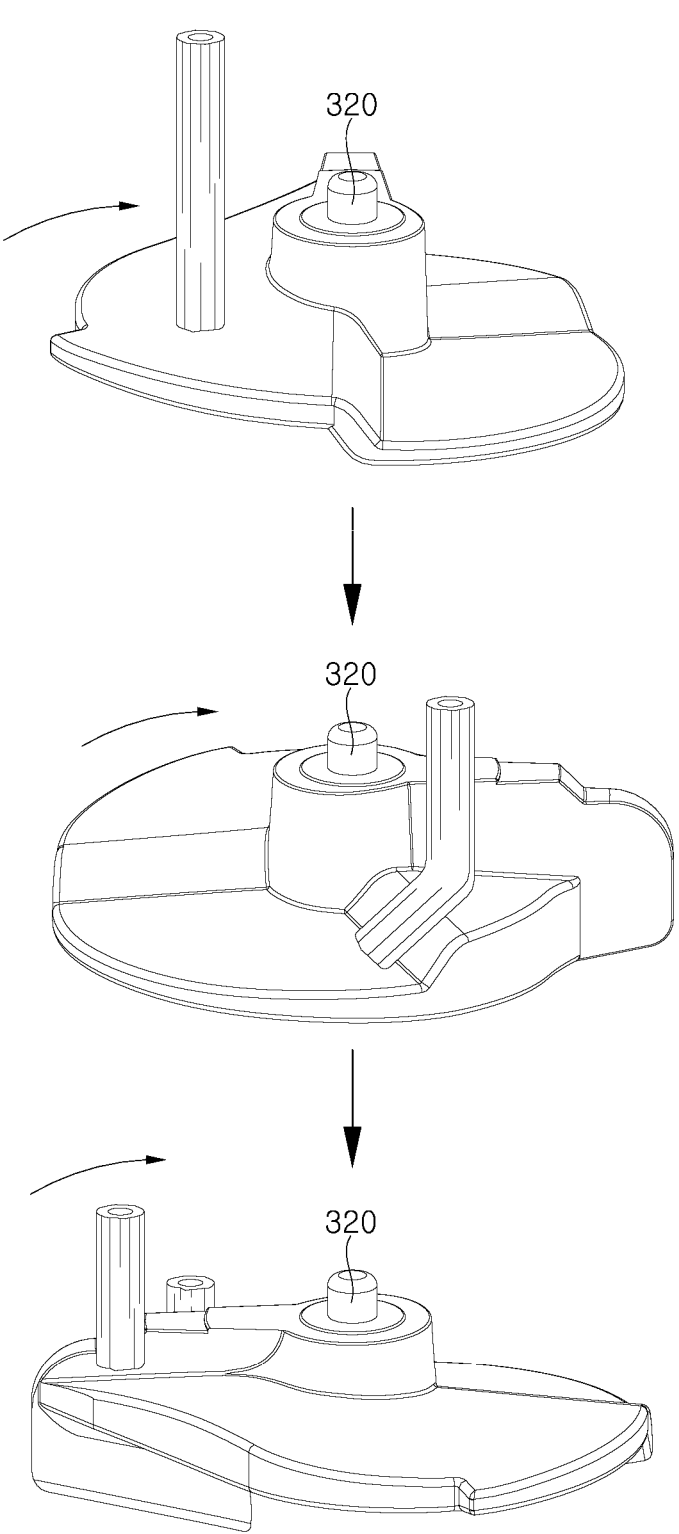

JUICE MODULE FOR JUICER

BACKGROUND

Technical Field

Embodiments of the present invention relate to a juice module for a juicer, and more particularly, to a juice module for a juicer with an improved structure that eliminates the inconvenience of having to cut a juice object in advance before inputting the juice object.

Description of the Related Art

In general, a juice module includes a juice drum having a juice space, a lid equipped with an inlet for inputting a juice object into the juice drum, a screw squeezing the juice object in the juice drum, and a mesh body separating juice and residue. In addition, the main body includes a drive motor for rotating the screw, and a shaft of the drive motor is connected to the screw in the juice module.

However, in the conventional juicer, the juice object input to the screw must be cut to a size capable of being juiced by the screw and input thereto. As an example, Korean Patent Registration No. 10-0793852 discloses a juicer technology configured to cut a juice object by means of a screw blade protruding from one side of the uppermost end of a rotation shaft of the screw.

However, in this technology, when the size of the juice object is larger than the length of the screw blade, there is a problem that the juice object must be previously cut to a size smaller than the length of the screw blade before input.

In addition, Korean Patent Registration No. 10-0966607 discloses a juicer technology in which a steel plate is installed on an entire upper surface of a screw to crush a juice object immediately before juice extraction.

However, crushing using the steel plate has a problem in that crushing must be performed at high speed rather than a low speed inherent in the juicer, and in order to suppress rotation of the juice object by the high speed of the steel sheet, there is a problem in that a user puts a lot of effort into pressing the juice object onto the steel sheet.

In addition, in conventional juicers, after the juice object is cut, since mass cut in a juice process is pressed into a mesh body and crushed, a phenomenon in which the mesh body is momentarily deformed by pressing of the cut mass occurs.

There is a problem in that these phenomena destroy injection molding maintaining a shape of the mesh body, or reduce a bonding force between the injection molding and the mesh body, and a gap causing outflow of residues and a decrease in a juice extraction rate occurs between the injection molding and the mesh body.

BRIEF SUMMARY

Embodiments of the present invention are conceived to solve the above problems in the art and provide reducing a load on a motor connected to a screw by forming a crushing portion and a support surface on an upper end of the screw rotating at low speed so as to first crush a juice object before reaching a spiral rib of the screw.

Embodiments of the present invention provide inputting a juice object without cutting the juice object by allowing a user to divide and input the juice object into a small diameter inlet or a large diameter inlet according to the size of the juice object.

Embodiments of the present invention provide allowing a user to conveniently input a juice object into a juice drum regardless of the size of the juice object, by firstly crushing the juice object input into a small diameter inlet by a crushing portion, allowing a part of the juice object input into a large diameter inlet to directly reach a screw spiral, and firstly crushing the remaining part by the crushing portion.

Embodiments of the present invention provide a juicer module for a juicer capable of eliminating a cumbersome process of previously cutting a juice object before inputting the juice object by using an input portion, by providing a structure previously crushing the juice object on a lid and a screw.

In addition, in order to input a juice object through an input portion without previously cutting the juice object, it is inevitably required to expand the size of the input portion. However, embodiments of the present invention provide a juice module that prevents a safety risk when the input portion is enlarged, because a person, especially a child's hand, may enter the input portion and reach a screw.

In accordance with one aspect of the present invention, a double input structure juice module includes a juice drum accommodating a mesh body therein and coupled to an upper end of a main body, wherein a lid into which a juice object is input is coupled to an upper portion of the juice drum; and a screw mounted inside the mesh body to rotate with respect to a screw rotation shaft, having a spiral rib formed on an outer circumferential surface, and receiving and crushing the juice object from the lid, wherein the screw includes a support surface formed in a direction intersecting the screw rotation shaft to support the juice object input into the lid and a crushing portion formed on an upper end to intersect the support surface and cutting the juice object, and wherein the lid includes an inlet into which the juice object is input, the inlet guiding the juice object to reach the spiral rib or the support surface.

In accordance with another aspect of the present invention, a double input structure juice module includes a juice drum accommodating a mesh body therein and coupled to an upper end of a main body; a lid including an inlet in which a path through which the juice object is input is formed as at least two or more paths and coupled to an upper end of the juice drum; and a screw mounted inside the mesh body, having a spiral rib formed on an outer circumferential surface, and receiving and crushing the juice object from the inlet, wherein the screw includes a crushing portion cutting the juice object on an upper end and a support surface supporting a part of the juice object input into the inlet.

According to embodiments of the present invention, a load on a motor connected to a screw may be reduced by forming a crushing portion and a support surface on an upper end of the screw rotating at low speed so as to first crush a juice object before reaching a spiral rib of the screw.

In addition, according to embodiments of the present invention, a juice object may be input without cutting the juice object by allowing a user to divide and input the juice object into a small diameter inlet or a large diameter inlet according to the size of the juice object In addition, according to embodiments of the present invention, a user may conveniently input a juice object into a juice drum regardless of the size of the juice object, by firstly crushing the juice object input into a small diameter inlet by a crushing portion, allowing a part of the juice object input into a large diameter inlet to directly reach a screw spiral, and firstly crushing the remaining part by the crushing portion In addition, according to embodiments of the present invention, a cumbersome process of previously cutting a juice object may be eliminated before inputting the juice object by using an input portion, by providing a structure previously crushing the juice object on a lid and a screw.

In addition, according to embodiments of the present invention, in order to input a juice object through an input portion without previously cutting the juice object, it is inevitably required to expand the size of the input portion. However, a safety risk may be prevented when the input portion is enlarged, because a person, especially a child's hand, may enter the input portion and reach a screw.

BRIEF DESCRIPTION OF THE SEVERAL VIEWS OF THE DRAWINGS

FIG. 1 is a perspective view of a dual input structure juice module according to an embodiment of the present invention.

FIG. 2 is a perspective view of a drum according to an embodiment of the present invention.

FIG. 3 is a perspective view illustrating a packing portion separated from a lower base according to an embodiment of the present invention.

FIG. 4 is a perspective view of a mesh body according to an embodiment of the present invention.

FIG. 5 is a perspective view of a screw according to an embodiment of the present invention.

FIG. 6 is a perspective view of a first modification embodiment in which a screw is modified according to the present invention.

FIG. 7 is a perspective view of a second modification embodiment in which a screw is modified according to the present invention.

FIG. 8 is a side view of a screw according to a modification embodiment of the present invention.

FIG. 9 is a top view of a screw according to a modification embodiment of the present invention.

FIG. 10 is a view illustrating an upper end of a screw according to the first modification embodiment of the present invention.

FIG. 11 is a perspective view of a lid according to an embodiment of the present invention.

FIG. 12 is a longitudinal cross-sectional view of a lid according to an embodiment of the present invention.

FIG. 13 is a view of a lid viewed from bottom according to an embodiment of the present invention.

FIG. 14 is a cross-sectional view of a dual input structure juice module according to an embodiment of the present invention.

FIG. 15 is a first use state view of a screw according to the second modification embodiment of the present invention.

FIG. 16 is a second use state view of a screw according to the second modification embodiment of the present invention.

DETAILED DESCRIPTION

Hereinafter, some embodiments of the present invention will be described in detail with reference to the accompanying drawings. In adding reference numerals to components in each drawing, it should be noted that the same components are given the same reference numerals as much as possible even though the same components are indicated in different drawings. In addition, in describing aspects of the present invention, if it is determined that a detailed description of a related known configuration or function may obscure the gist of the present invention, the detailed description thereof will be omitted.

In describing the components of the embodiment according to the present invention, reference numerals such as first, second, i), ii), a), and b) may be used. These reference numerals are only for distinguishing the components from other components, and the nature, sequence, or order of the components are not limited by the reference numerals. When a part in the specification 'includes' or 'comprises' a certain component, it means that the part may further include other components, rather than excluding other components, unless explicitly stated to the contrary.

An embodiment of the present invention provides a dual input structure juice module, including: a juice drum accommodating a mesh body therein and coupled to an upper end of a main body, wherein a lid into which a juice object is input is coupled to an upper portion of the juice drum; and a screw mounted inside the mesh body to rotate with respect to a screw rotation shaft, having a spiral rib formed on an outer circumferential surface, and receiving and crushing the juice object from the lid, wherein the screw includes a support surface formed in a direction intersecting the screw rotation shaft to support the juice object input into the lid and a crushing portion formed on an upper end to intersect the support surface and cutting the juice object, and the lid includes an inlet into which the juice object is input, the inlet guiding the juice object to reach the spiral rib or the support surface.

Referring to FIGS. 1 to 16, a dual input structure juice module 10 according to an embodiment of the present invention includes all or part of a juice drum 100, a mesh body 200, a screw 300, a lid 400, and a main body 500.

Hereinafter, the coupling relationship of the components of embodiments of the present invention will be described. The double input structure juice module 10 according to an embodiment of the present invention includes the juice drum 100 including a juice space therein and having a residue outlet 110 and a juice outlet 150 formed in one side and the other side of an outer surface thereof, the mesh body 200 installed inside the juice drum 100 to separate juice from residues generated when extracting the juice object, the screw 300 installed inside the mesh body 200 to extract the juice object, the lid 400 installed on an upper end of the juice drum 100 and having a large diameter inlet 410 and a small diameter inlet 420 into which the juice object is input, and the main body 500 coupled to a lower end of the juice drum 100.

In addition, although not shown, in the dual input structure juice module 10 according to an embodiment of the present invention, an opening/closing means or device may be applied to selectively open and close the juice outlet 150 of the juice drum 100. Although not shown, the opening and closing means or device may be applied to the juice drum 100 to selectively open and close the juice outlet 150. A cock valve may be used as the opening/closing means or device, and the cock valve includes a valve body that advances or retreats the juice outlet 150, but a structure in which a tip of the valve body is oriented toward the juice outlet 150 is considered advantageous. Meanwhile, various other means may be employed as the means or device for opening and closing the juice outlet 150 in addition to the above structure.

Referring to FIGS. 2 and 3, the juice drum 100 includes all or part of the residue outlet 110, an upper base 120, a lower base 130, a packing portion 140, and a juice outlet 150.

A shape is different between the juice drum 100 of FIG. 2 and the juice drum 100 of FIG. 3, as well as embodiments of the present invention may employ all types of drums that may be coupled with the screw 300 and the lid 400.

The juice drum 100 of FIG. 2 represents a general drum, and the juice drum 100 of FIG. 3 is characterized in that the residue outlet 110 is slidably coupled.

The juice drum 100 is formed such that the lid 400 is detachable from the juice drum 100. In addition, a residue outlet 110 is formed in one side of the juice drum 100, and the juice outlet 150 is formed on the other side thereof.

The upper base 120 is integrally formed with the juice drum 100, and the lower base 130 is formed to be detachable from the upper base 120.

The packing portion 140 prevents residues filtered when the screw 300 extracts fruit juice from the juice object and fine juice in the residues from leaking between a gap between the upper base 120 and the lower base 130. Here, the packing portion 140 may be a general type of packing.

Meanwhile, a packing groove (not shown) is formed in a lower portion of the packing portion 140, and a packing fixing protrusion formed on the lower base 130 may be coupled to or detached from the packing groove.

Meanwhile, the upper base 120 and the lower base 130 of the residue outlet 110 are formed in a separable structure. For example, the upper base 120 and the lower base 130 are configured to be slide hinged to each other.

In an embodiment of the present invention, when the user opens the residue outlet 110, the user may release a mutual fastening state by separating a slide fixing portion 131 from the upper base 120.

The juice outlet 150 is configured to be inclined downward so that the extracted juice is smoothly discharged to the outside. In addition, the juice outlet 150 may further include a juice opening and closing hole (not shown) configured to prevent juice from being discharged to the outside or to allow the juice to be discharged to the outside in one end.

Referring to FIG. 4, the mesh body 200 includes all or part of a perforated mesh body 210, a lower perforated mesh body 215, a juice rib 220, and a lower juice rib 225.

The mesh body 200 is detachably fixedly coupled to the juice drum 100. In addition, the mesh body 200 is formed in a predetermined shape, for example, a cylindrical shape.

In addition, the mesh body 200 may be formed in a cylindrical shape having a space that gradually increases toward an upper portion.

The perforated mesh body 210 is formed on the outside of the mesh body 200, for example, on the whole of the outside or part of the entire circumference. In addition, the perforated mesh body 210 may be formed integrally by injection molding on the mesh body, or may be modularized and detachably formed.

In addition, the size of each of at least one mesh hole formed in the perforated mesh body 210 may be the same or different. For example, the size of the mesh hole formed in the upper portion of the perforated mesh body 210 may be different from that of the mesh hole formed in the lower portion of the perforated mesh body 210. In addition, the lower perforated mesh body 215 is formed relatively more densely than the perforated mesh body 210, and may have a small diameter.

The juice rib 220 and the lower juice rib 225 are disposed inside the mesh body 200 and are connected to the screw 300 to cut, crush, or press the juice object inside the mesh body 200. The juice rib 220 and the lower juice rib 225 may be configured in plurality, and at least one of the plurality of juice ribs 220 may correspond to a spiral rib 310 formed in the screw 300 to be formed to gradually increase or decrease the thickness in a vertical direction. Meanwhile, the juice rib 220 and the lower juice rib 225 may have different lengths in the vertical direction.

In addition, the at least one lower juice rib 225 may be formed uniformly or non-uniformly in the lower portion of the mesh body 200. The lower juice ribs 225 may be formed in the same number as the juice ribs 220, or may be formed in a greater number than the juice ribs 220.

Referring to FIG. 5, the screw 300 according to an embodiment of the present invention includes all or part of the spiral rib 310, a screw rotation shaft 320, a transfer surface 330, a crushing portion 340, and a support surface 350, and the screw 300 is disposed inside the mesh body 200.

The spiral rib 310 is formed to be inclined downward from an upper end of the screw 300. For example, the spiral rib 310 is connected from an upper side to a lower side of the screw 300 and is formed to extend radially from an uppermost end. The spiral rib 310 rotates together with the screw 300 and cuts the juice object input into the mesh body 200.

The screw rotation shaft 320 is formed in the center of the screw 300 and is coupled to the main body 500. Hereinafter, in describing the coupling relationship of the screw 300, the screw rotation shaft 320 is set as a reference and the coupling relationship will be described. Here, setting the screw rotation shaft 320 as the reference means describing the coupling relationship with respect to a straight line identical to the screw rotation shaft 320.

The transfer surface 330 is formed on the upper end of the screw 300 and is a predetermined plate formed with a certain height and area. The crushing portion 340 cutting or crushing the juice object input into the large diameter inlet 410 or the small diameter inlet 420 is formed on an upper side of the transfer surface 330. Meanwhile, the support surface 350 extending from the crushing portion 340 and inclined at a certain angle is formed on a rear end of the transfer surface 330. The transfer surface 330 is positioned in a radial direction with respect to the screw rotation shaft 320.

The crushing portion 340 is formed to extend to a certain height and area in the upper portion of the screw 300, that is, at a position where the transfer surface 330 and the support surface 350 are connected. For example, the crushing portion 340 may be formed in an upper end than the spiral rib 310. The crushing portion 340 is formed in a direction intersecting the support surface 350, and a crushing blade 344 is formed in an upper end of the crushing portion 340. For example, the support surface 350 is formed along the periphery with respect to the screw rotation shaft 320 to intersect the screw rotation shaft 320, and a part of the support surface 350 intersects the crushing portion 340. Meanwhile, the crushing portion 340 may be formed to vertically intersect the support surface 350. In addition, the crushing portion 340 rotates based on a rotational direction of the screw 300, and primarily cuts the juice object input into the large diameter inlet 410 or the small diameter inlet 420. The crushing blade 344 formed on the upper end of the crushing portion 340 may be formed to be inclined from the crushing portion 340. For example, when the screw 300 is viewed from the side, the crushing blade 344 is formed to be inclined while forming an inclination angle with respect to the screw rotation shaft 320. Here, the inclination angle is formed in a direction in which the juice object is drawn into the crushing portion 340. When the inclination angle is formed in the direction in which the juice object is drawn, the juice object first contacts a tip of the crushing blade 344 when the juice object comes into contact with the crushing portion 340. When the juice object is cut, a part of the juice object in contact with the tip of the crushing blade 344 first begins to be cut, and then, an upper end of the juice object crosses the crushing portion 340 to go in a direction of the support surface 350. As such, when the crushing blade 344 forms the inclination angle, there is an effect of preventing the juice object such as carrot from being cut and splashed. In order to achieve this effect, the effect is further maximized as the inclination angle is inclined in the direction in which the juice object is drawn. If the crushing blade 344 does not form an inclination with the screw rotation shaft 320, since the juice object is in contact with an area part of the crushing portion 340 and is broken, a phenomenon in which the juice object is splashed occurs. Meanwhile, the crushing portion 340 includes an extension member 346 formed to extend in an outer direction of the support surface 350. The extension member 346 is not a member separately formed in the crushing portion 340, but is a term referring to an outer end of the crushing portion 340. In a first modification embodiment of the present invention to be described below, a crushing accommodation groove (332 in FIG. 6) may be formed at a position of the extension member 346. The crushing accommodation groove 332 will be described separately. When the crushing portion 340 according to an embodiment of the present invention is formed to extend to the extension member 346, it is possible to reduce a phenomenon in which the juice object collides with an inner surface of the lid 400. In contrast, when the crushing accommodation groove 332 is formed at the position of the extension member 346, the screw 300 needs a crushing rib 460 formed on the inner surface of the lid 400 in order to efficiently crush the juice object. That is, since the juice object is cut when the crushing accommodation groove 332 and the crushing rib 460 intersect, a phenomenon in which the juice object frequently collides with the inner surface of the lid 400 occurs. However, if the crushing portion 340 is formed to extend to the extension member 346, even if there is no crushing rib 460 on the inner surface of the lid 400, since the screw 300 may efficiently crush the juice object, it is possible to reduce a phenomenon in which the juice object collides with the inner surface of the lid 400. Such a technical feature may increase a proportion of a space occupied by the crushing portion 340 in the space formed inside the lid 400, and accordingly, the crushing portion 340 may cut the juice object more effectively.

The support surface 350 may be formed such that one side extends from the rear surface of the crushing portion 340, and the other side extends up to a front surface of the crushing portion 340. Here, one side may be formed at a relatively higher position than the other side. The support surface 350 may extend from one side to the other side, and a curved portion 355 may be formed therebetween. The curved portion 355 is a curved surface formed to cut the juice object at an appropriate height when the juice object enters the crushing portion 340 and is cut. The curved portion 355 forms an inclined surface in order for a cut surface of the crushing portion 340 to form an appropriate height. The inclined surface may be formed to have an upper portion of a convex shape. When the curved portion 355 is formed in the convex shape, there is an effect that the juice object is cut by the crushing portion 340 at an appropriate height. Accordingly, when designing a shape of the support surface 350, the shape may be designed by adjusting an inclination degree of the curved portion 355.

On the edge of the support surface 350, that is, on the side surface, a locking step projection 352 having a shape in which a part of the support surface 350 protrudes may be formed. When the juice object flowing in the support surface 350 is pushed to the edge of the support surface 350, the juice object is crushed by the locking step projection 352 formed on the edge of the support surface 350. The juice object crushed by the locking step projection 352 falls down and is crushed by the spiral rib 310 of the screw 300.

In addition, in the detailed description of embodiments of the present invention, the locking step projection 352 performs not only a function of crushing the juice object pushed to the edge, but also a function of flowing the juice object again. For example, vegetable such as water parsley may be pushed by the locking step projection 352 and flow without being crushed by the locking step projection 352.

Hereinafter, a first modification embodiment of the screw 300 described in FIG. 5 will be described with reference to FIG. 6.

In a screw 300*a* according to the first modification embodiment of the present invention, a crushing accommodation groove 332 of a certain size is formed in a part of the upper side of the transfer surface 330. That is, the crushing accommodation groove 332 is formed in the upper side of the transfer surface 330, and the crushing accommodation groove 332 is connected to the crushing portion 340. Compared with the screw 300 of FIG. 5 in which the extension member 346 is formed, the screw 300*a* of FIG. 6 includes the crushing accommodation groove 332 instead of the extension member 346.

Since the crushing accommodation groove 332 is formed as an accommodation groove of a certain size, the crushing rib 460 protrudes as much as the size of the crushing accommodation groove 332 to interact with each other and not only cut the juice object, but also drag an uncut juice object (celery) and flow the juice object downward the screw.

When the crushing accommodation groove 332 is formed in the screw 300*a*, the crushing rib 460 must be formed on the inner surface of the lid 400. When the juice object is located in an empty space of the crushing accommodation groove 332, the juice object is crushed by the crushing rib 460 when the screw 300*a* rotates.

Hereinafter, a second modification embodiment of a screw 300*b* described in FIG. 5 will be described with reference to FIGS. 7 and 8.

The second modification embodiment further includes the crushing accommodation groove 332, an accommodation portion 360, and a crushing portion entry projection 370 included in the first modification embodiment. The description of the same component as those of the screw 300 of FIG. 5 and the screw 300*a* of FIG. 6 is omitted, and the accommodation portion 360 and the crushing portion entry projection 370 formed in the screw 300*b* of FIGS. 7 and 8 will be described.

The accommodation portion 360 is connected to the other side of the support surface 350 and is formed. Meanwhile, the other side of the support surface 350 is connected to the accommodation portion 360. For example, the other side of the support surface 350 is connected to an accommodation groove guide portion 362 inclined downward, and thus the support surface 350 and the accommodation portion 360 are connected. Accordingly, the height of the accommodation portion 360 is formed at a relatively low position in the support surface 350.

One side of the accommodation portion 360 is connected to the support surface 350, and the other side of the accommodation portion 360 is connected to the crushing portion entry projection 370. Meanwhile, an end of one side of the accommodation portion 360 includes the accommodation groove guide portion 362 inclined at a predetermined angle so that the juice object seated on the support surface 350 may be seated in the accommodation portion 360. In addition, an end of the other side of the accommodation portion 360 includes an upper flow projection 364 inclined at a predetermined angle so as to be connected to the crushing portion entry projection 370. Here, both the accommodation groove guide portion 362 and the upper flow projection 364 are formed to be inclined upward with respect to the accommodation portion 360. In addition, a lower flow projection 366 is formed on the lower side of the accommodation groove guide portion 362 in a shape similar to an inclined surface of the accommodation groove guide portion 362. The lower flow projection 366 is formed to reduce the cost of the screw 300b and reduce the weight of the screw.

Here, the upper flow projection 364 is formed in an inclined surface to the extent that a juice object in the long shape may be laid down between the accommodation portion 360 and the crushing portion entry projection 370. Therefore, the juice object in the long shape is input into the large diameter inlet 410 or the small diameter inlet 420, and then sequentially passes through the support surface 350 and the accommodation groove guide portion 362 and is seated at a relatively low position, that is, in the accommodation portion 360. Thereafter, the juice object in the long shape meets the upper flow projection 364 before being cut by the crushing portion 340 and is inclined and laid down on the crushing portion entry projection 370. That is, the juice object in the long shape spans the upper flow projection 364 and is laid down between the accommodation portion 360 and the crushing portion entry projection 370.

As a result, the inclined juice object intersects the crushing portion 340 formed on the upper side of the transfer surface 330 and the crushing rib 460 formed on the inside of a hopper 430 and is crushed and cut.

Referring to FIG. 9, FIG. 9A is a view showing the screw 300a according to the first modification embodiment, and FIG. 9B is a view showing the screw 300b according to a second modification embodiment.

The screws 300a and 300b of the double input structure juice module 10 includes a first space portion 301, a second space portion 302, a third space portion 303, and a cutting portion 304. Meanwhile, the spiral rib 310 is formed on the outer surface of the screws 300a and 300b, and the screw rotation shaft 320 is formed in the center thereof.

In addition, the first space portion 301, the second space portion 302, and the third space portion 303 are formed in the shape of a rotating plate on the upper side of the screw rotation shaft 320. The first space portion 301, the second space portion 302, and the third space portion 303 are formed to be perpendicular or inclined to the cutting portion 304. Here, when the cutting portion 304 is formed perpendicularly, an area in contact with the juice object is minimized, thereby increasing the crushing force of the cutting portion 304.

In addition, the first space portion 301, the second space portion 302, and the third space portion 303 are continuously connected from the cutting portion 304 in a rotation direction of the screw rotation shaft 320 and are formed.

In addition, as shown in FIG. 9B, according to the screw 300b of the second modification embodiment, since an area of the first space portion 301 is formed at a position relatively lower than the remaining area, that is, the second space portion 302 and the third space portion 303, the area forms a step structure with the remaining area described above. Therefore, the juice object is cut down by a height of the step structure. Here, the step structure may be understood as a concept corresponding to height a shown in FIG. 10A or a height difference between the cutting portion 304 and the first space portion 301.

Meanwhile, the second space portion 302 is formed between the first space portion 301 and the front surface of the cutting portion 304, and the second space portion 302 is formed at a position relatively higher than that of the first space portion 301.

In addition, one side of the third space portion 303 is connected to the rear surface of the cutting portion 304, and the other side thereof is connected to the first space portion 301.

In addition, the upper flow projection 364 is formed to be inclined downward from the second space portion 302 to the first space portion 301 to connect the first space portion 301 and the second space portion 302.

In addition, the accommodation groove guide portion 362 is formed to be inclined downward from the third space portion 303 to the first space portion 301 to connect the third space portion 303 and the first space portion 301.

In addition, the locking step projection 352 is formed to protrude a part of the edge of the third space portion.

Hereinafter, a process in which the juice object is cut and grinded when the screws 300a and 300b are rotated will be described in more detail.

First, when a juice object, for example, celery, is put into the large diameter inlet 410 or the small diameter inlet 420, according to the rotation of the screws 300a and 300b, only a part of the celery is cut by the cutting portion 304 on the upper ends of the screws 300a and 300b. Here, the cutting portion 304 is a component corresponding to the crushing portion 340 of FIG. 5.

Thereafter, a part of a lower end of the celery cut by the cutting portion 304 falls into a side space between the cutting portion 304 and the second space portion 302. Alternatively, a part of the lower end of the celery falls into a side space between the cutting portion 304 and the third space portion 303. Meanwhile, the remaining part of the celery that has not fallen is moved by a vertical surface of the cutting portion 304 and grinded by the crushing rib 460.

As shown in FIG. 9B and FIG. 16, according to the screw 300b of the second modification embodiment, an uncutting portion of the celery, that is, the upper end of the celery, is seated in the third space portion 303, moves in a direction of the first space portion 301 of a relatively low height by the rotation of the screw 300b and is seated in the first space portion 301.

Here, the first space portion 301 and the third space portion 303 are formed in a stepped structure, that is, a structure forming a step, and the step causes the celery to go down when the screw 300b rotate.

Meanwhile, the second space portion 302 is formed in a front part of the cutting portion 304, that is, between the first space portion 301 and the cutting portion 304. The second space portion 302 drags the celery so that a relatively thin stem in a stem of the uncut celery may be cut by the cutting portion 304.

The third space portion 303 is a space for dragging the celery when the celery is not completely dragged in the first space portion 301 and the second space portion 302, and is a space where the celery is seated. A projection in a partially protruding shape is formed on one end of an outer side of the third space portion 303. This projection is a component that performs the same function as the locking step projection 352. When the juice object flowing in the third space portion 303 is pushed to the edge of the third space portion 303, the juice object is crushed by the projection formed on the edge.

That is, the third space portion 303 is a component for dragging a stem part, which has more leaves and is thinner than a thick stem of celery. Accordingly, the thick stem part of celery is cut or pulled out in the first space portion 301 and the second space portion 302, and the thin stem part is pulled out in the third space portion 303.

Meanwhile, the above description shows a grinding process of vegetables similar to celery, and when a hard juice object such as a carrot is put into the large diameter inlet 410 or the small diameter inlet 420, the carrot is cut by the cutting portion 304 by a height of the cutting portion 304, and transported and grinded.

In this regard, by adjusting the height of the cutting portion 304 of the present invention, it is possible to adjust a cutting amount of the juice object.

For example, when the cutting portion 304 is relatively high, a relatively larger amount of carrots is cut and grinded when the screws 300a and 300b rotate one round, and when the cutting portion 304 is relatively low, a relatively small amount of carrots cut and grinded when the screws 300a and 300b rotate one round. Therefore, the dual input structure juice module 10 according to an embodiment of the present invention has the effect of controlling the cutting amount of the juice object. Meanwhile, when a vertical height of the cutting portion 304 is too low, since there may occur a case where the juice object such as carrot is not cut, the cutting portion 304 needs to be formed at an appropriate height.

Meanwhile, a length b of a blade of the cutting portion 304 may be related to a function of dragging the juice object. Here, the length b of the blade is shown in FIG. 10B.

For example, when the length b of the blade cutting the juice object in the cutting portion 304 is relatively short, an automatic input of the juice object such as celery may be difficult. Here, the automatic input refers to a series of processes such as a process in which celery descends from the third space portion 303 to the first space portion 301 based on the rotation of the screws 300a and 300b. Therefore, when the length b of the blade is relatively short, since a problem may occur that the celery is not properly dragged, the length b of the blade needs to be more than a certain length.

In addition, the cutting portion 304 may be formed to have the longest diameter from a rotation shaft as compared to the first space portion 301, the second space portion 302, and the third space portion 303. When the diameter of the cutting portion 304 is the longest, when cutting the juice object, for example, at the time when the cutting portion 304 passes through the small diameter inlet 420, there is hardly any gap between a lower end of the small diameter inlet 420 and the cutting portion 304. Therefore, the juice object may not flow down, and may be cut by the cutting portion 304.

Referring to FIGS. 11 to 13, the lid 400 includes all or part of the large diameter inlet 410, the small diameter inlet 420, the hopper 430, an input guide portion 440, and a rotation shaft accommodation groove 450.

FIGS. 12B and 13B show modification embodiments of FIGS. 12A and 13A, respectively, and further includes the crushing rib 460 compared to FIGS. 12A and 13A. Accordingly, FIGS. 12A and 13A show the lid 400 corresponding to the screw 300 of FIG. 5, and FIGS. 12B and 13B show the lid 400 corresponding to the screws 300a and 300b of FIGS. 6 and 7. Hereinafter, for convenience, the lid 400 of FIGS. 12B and 13B will be described.

The lid 400 is coupled to the upper end of the juice drum, and a path, that is, an inlet, is formed through which the juice object is input and guided to reach the spiral rib 310 or the support surface 350. Here, the large diameter inlet 410, which will be described below, guides the juice object to reach the spiral rib 310, and the small diameter inlet 420 forms the path so that the juice object reaches the support surface 350 and guides the juice object.

The large diameter inlet 410 is a path through which a juice object of a relatively large size is input, and the small diameter inlet 420 is a path through which a juice object of a relatively small size is input.

The hopper 430 is formed so that the path for inputting the juice object into the juice drum 100 is divided into two paths. That is, the large diameter inlet 410 through which the juice object of a large size is input, and the small diameter inlet 420 through which the juice object of a small size is input, and the rotation shaft accommodation groove 450 are formed in the hopper 430. Meanwhile, the crushing rib 460 is formed inside the hopper 430 in a vertical direction to protrude inwardly.

The input guide portion 440 is formed in the lower end of the large diameter inlet 410. In addition, a part of the input guide portion 440 may be formed in a structure extending beyond an outside from an upper area of the mesh body 200. When the part of the input guide portion 440 is formed beyond the outside from the upper area of the mesh body 200, the juice object input to the large diameter inlet 410 may be guided to the mesh body 200.

Meanwhile, the input guide portion 440 is a component so that a juice object is put into the large diameter inlet 410 and is not cut by the crushing portion 340 may be transferred to the mesh body 200 or the screw 300. That is, the input guide portion 440 is a component for naturally connecting the large diameter inlet 410 and the mesh body 200 formed outside with respect to the screw rotation shaft 320.

In addition, the input guide portion 440 is formed while overlapping the large diameter inlet 410, continuously connected from the large diameter inlet 410, and formed to be inclined toward the screw rotation shaft 320, so that grinding of the side of the juice object starts by the crushing portion 340 or the spiral rib 310.

In addition, the input guide portion 440 may be formed to be stepped with the mesh body at the end. At this time, the end of the input guide portion 440 may be formed to be identical to an inner surface of the upper end of the mesh body 200.

The rotation shaft accommodation groove 450 is a predetermined groove formed so that the screw rotation shaft 320 formed on the upper side of the screw 300 may be inserted.

The crushing rib 460 is formed on the inner surface of the hopper 430 in a vertical direction, and crushes the juice object by interaction with the screws 300a and 300b. The crushing rib 460 is formed in plurality. In addition, the crushing rib 460 may have a shape that is narrower or wider as it goes down.

FIG. 15 is a first use state view of a screw according to the second modification embodiment of the present invention.

FIG. 16 is a second use state view of a screw according to the second modification embodiment of the present invention.

Referring to FIG. 15, the juice object, for example, carrot, is seated on the support surface 350 formed on the upper side of the screw and then is cut when the screw 300b rotates one round.

Meanwhile, referring to FIG. 16, the juice object, for example, celery, is seated on the support surface 350 formed on the upper side of the screw and then meets the upper flow projection 364 to be inclined and laid down on the crushing portion entry projection 370 before being cut by the crushing portion 340. That is, a juice object in the long shape spans the upper flow projection 364 and is laid down between the accommodation portion 360 and the crushing portion entry projection 370 and then is cut when the screw 300*b* rotates one round.

Although some embodiments have been described herein, it should be understood that these embodiments are provided for illustration only and are not to be construed in any way as limiting the present invention, and that various modifications, changes, and alterations may be made by those skilled in the art without departing from the spirit and scope of the invention. Therefore, the scope of the present invention should be defined by the appended claims and equivalents thereto.

The invention claimed is:

1. A juice module comprising:
a juice drum accommodating a mesh body therein and coupled to an upper end of a main body;
a lid including an inlet through which a juice object is input and coupled to an upper end of the juice drum; and
a screw mounted inside the mesh body, having a spiral rib formed on an outer circumferential surface, for receiving and grinding the juice object from the inlet,
wherein the screw includes a crushing portion for bluntly cutting or crushing the juice object and a support surface configured to support a part of the juice object input into the inlet,
wherein the support surface is formed so that one side extends continuously from a rear surface of the crushing portion and the other side of the support surface extends continuously from a front end of the crushing portion, and
wherein the crushing portion projects from the support surface in a vertical direction, and is formed at a predetermined height to bluntly cut or crush the juice object during operation of the juice module.

2. The juice module according to claim 1, wherein the inlet includes a small diameter inlet and a large diameter inlet formed in a path different from that of the small diameter inlet.

3. The juice module according to claim 2, wherein the large diameter inlet includes an input guide portion to guide the juice object to be transferred to the screw.

4. The juice module according to claim 3, wherein the input guide portion is continuously connected from the large diameter inlet, is formed inclined toward a central shaft of the screw to assist a side of the juice object to start to be crushed by the screw.

5. The juice module according to claim 3, wherein a part of the input guide portion is formed in a structure extending beyond an outside from an upper area of the mesh body.

6. The juice module according to claim 1, wherein the crushing portion is formed in a vertical direction with respect to the support surface, and a crushing blade for bluntly cutting or crushing the juice object is formed on an upper end of the crushing portion.

7. The juice module according to claim 1, wherein a locking step projection is formed on the support surface in a partially protruding shape from an edge.

8. The juice module according to claim 1,
wherein the screw further includes a transfer surface to transfer the juice object in a rotational direction of the screw, and
wherein the transfer surface is a cross-section formed at a lower end of the crushing portion.

9. The juice module according to claim 1, wherein the screw includes a transfer surface positioned in a radial direction with respect to the screw rotation shaft, and
wherein the transfer surface is formed to a certain height and area.

10. The juice module according to claim 1, wherein the support surface is formed so that one side is formed at a position relatively higher than that of the other side.

11. The juice module according to claim 1, wherein the crushing portion includes an extension member formed to extend in an outer direction of the support surface.

12. The juice module according to claim 1,
wherein the lid further includes a crushing rib formed on an inner surface in a vertical direction, and
wherein the crushing rib cuts or crushes the juice object by interaction with the crushing portion.

13. The juice module according to claim 1, wherein the inlet is formed as two or more paths.

* * * * *